US012234878B2

(12) United States Patent
Bouche et al.

(10) Patent No.: US 12,234,878 B2
(45) Date of Patent: Feb. 25, 2025

(54) TORSION DAMPER AND CLUTCH DISK

(71) Applicant: VALEO EMBRAYAGES, Amiens (FR)

(72) Inventors: Gabriel Bouche, Cergy Pontoise (FR); Pascal Dast, Cergy Pontoise (FR); Roel Verhoog, Cergy Pontoise (FR); Olivier Marechal, Cergy Pontoise (FR); Bernard Dubois, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 695 days.

(21) Appl. No.: 17/599,250

(22) PCT Filed: Mar. 30, 2020

(86) PCT No.: PCT/EP2020/058931
§ 371 (c)(1),
(2) Date: Sep. 28, 2021

(87) PCT Pub. No.: WO2020/201204
PCT Pub. Date: Oct. 8, 2020

(65) Prior Publication Data

US 2022/0178421 A1 Jun. 9, 2022

(30) Foreign Application Priority Data

Mar. 29, 2019 (FR) ..................................... 19 03377

(51) Int. Cl.
*F16F 15/129* (2006.01)

(52) U.S. Cl.
CPC ................................ *F16F 15/1292* (2013.01)

(58) Field of Classification Search
CPC .. F16F 15/129; F16F 15/1292; F16F 15/1295; F16F 15/139; F16F 15/1392; F16F 15/1395

(Continued)

(56) References Cited

U.S. PATENT DOCUMENTS 3,938,635 A * 2/1976 Davies .................. F16F 15/129 192/213.31
3,983,982 A * 10/1976 Worner ................. F16F 15/129 464/68.41

(Continued)

FOREIGN PATENT DOCUMENTS

DE 4430261 C1 * 1/1996 ............ F16F 15/129
DE 19919414 A1 * 11/2000 .......... F16F 15/1292

(Continued)

OTHER PUBLICATIONS

International Search Report issued on Sep. 11, 2020 in PCT/EP2020/058931 filed on Mar. 30, 2020, 2 pages.

*Primary Examiner* — Josh Skroupa
(74) *Attorney, Agent, or Firm* — Oblon, McClelland, Maier & Neustadt, L.L.P.

(57) ABSTRACT

A torsion damper for a vehicle powertrain includes a first element having a support element and a second element movable in rotation with respect to the first element about an axis of rotation X. Springs are mounted between the first element and the second element so as to compress to allow relative rotation about the X axis between the first element and the second element. A friction device including a friction washer provided with at least one fixing portion rigidly fixed in rotation on a support element of the first element, the friction washer having a friction portion having a friction track backed against a dorsal face of the friction portion. An elastic washer arranged axially between the first element and the dorsal face of the friction portion, each fixing portion for fixing to the first element being connected to the friction portion by a flexible element allowing axial displacement of the dorsal face of the friction portion relative to the support element of the first element.

20 Claims, 9 Drawing Sheets

(58) Field of Classification Search
USPC .............................................. 464/68.4, 68.41
See application file for complete search history.

(56) References Cited

U.S. PATENT DOCUMENTS

| | | | | | |
|---|---|---|---|---|---|
| 4,018,320 | A * | 4/1977 | Schrape | F16F 15/129<br>464/68.41 |
| 4,537,295 | A * | 8/1985 | Fadler | F16F 15/1292<br>464/68.41 |
| 4,697,684 | A * | 10/1987 | Maycock | F16F 15/129<br>192/214.1 |
| 4,698,045 | A * | 10/1987 | Billet | F16F 15/12353<br>464/68.2 |
| 5,909,790 | A * | 6/1999 | Lohaus | F16F 15/129<br>464/68.4 |
| 6,089,983 | A | 7/2000 | Lebas et al. | |
| 8,419,553 | B2 * | 4/2013 | Sekine | F16F 15/12366<br>464/68.8 |
| 10,240,657 | B2 * | 3/2019 | Lebas | F16F 15/145 |
| 10,968,978 | B2 * | 4/2021 | Uehara | F16F 15/139 |

FOREIGN PATENT DOCUMENTS

| | | | | |
|---|---|---|---|---|
| DE | 102014219885 A1 * | 4/2016 | F16F 15/129 |
| EP | 0 778 427 A1 | 6/1997 | |
| EP | 0 778 427 B1 | 6/2001 | |
| WO | WO 2018/104530 A1 | 6/2018 | |
| WO | WO-2018167440 A1 * | 9/2018 | F16F 15/129 |

* cited by examiner

Fig. 5
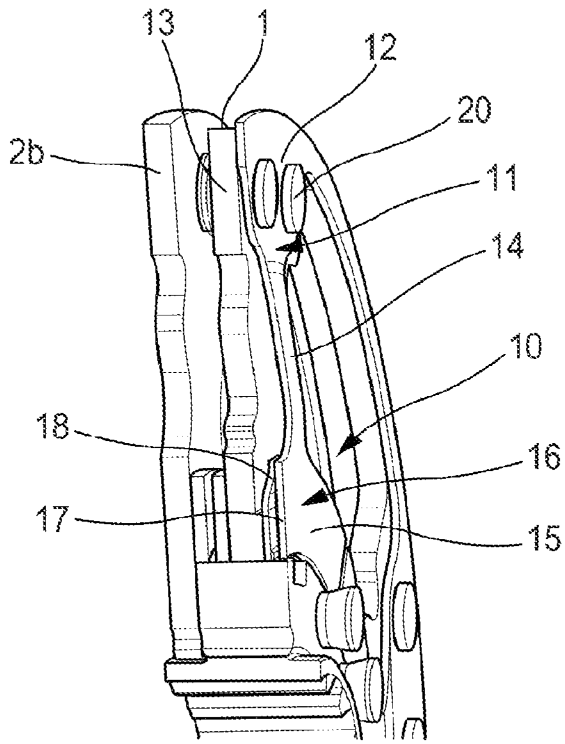
[Fig. 6]
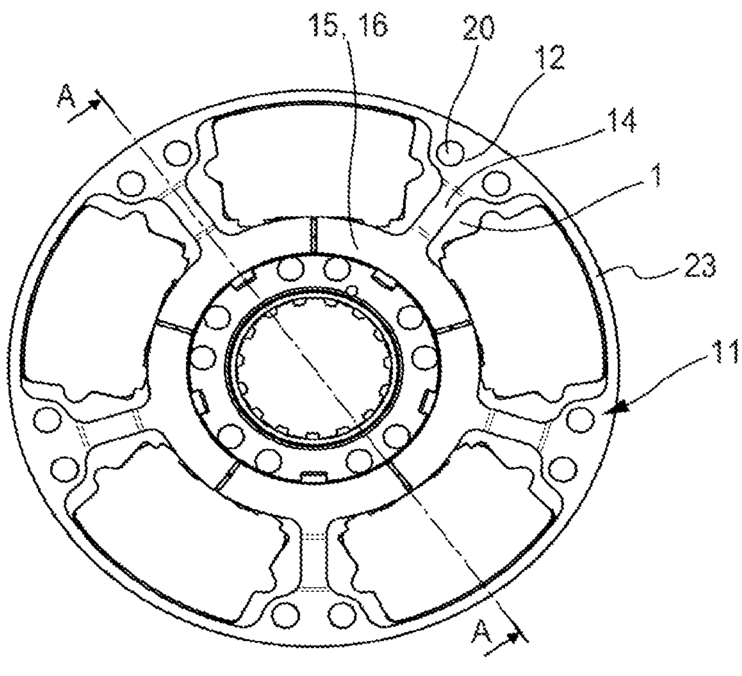

TORSION DAMPER AND CLUTCH DISK

The invention relates to a torsion damper for a vehicle powertrain. More precisely, the invention is intended for clutch disks of motor vehicles, for example for trucks.

PRIOR ART

A clutch disk conventionally comprises a friction disk with an axis of rotation X, provided with friction linings, a hub configured to drive in rotation about this shaft X a gearbox input shaft and a torsion damper arranged kinematically between the friction disk and the hub. A torsion damper conventionally comprises springs interposed between a first element and a second element of the damper to compress while allowing relative rotation between the first element and the second element about the axis of rotation X and a friction device configured to dissipate by friction the energy stored in the springs.

To do this, the friction devices used in clutch disks generally include friction washers which are locked in rotation on a first element of the damper thanks to coupling elements such as teeth or splines, or to folded tabs which are inserted into complementary slots of the first element.

Such friction devices have the advantage of allowing axial displacement of the friction washer, along the X axis, as the friction parts become thinner due to wear.

Nevertheless, to allow axial displacement of the friction washer relative to the first element, the aforementioned coupling elements (teeth, splines, tabs) must cooperate with minimum angular play. In the absence of angular play, the axial displacement of the friction washer would be difficult or even impossible due to the axial friction between the teeth/splines . . . .

The presence of angular play therefore means that the friction washer and the first element are not rigorously locked in rotation with one another, especially since peening phenomena between these coupling elements tend to amplify the initial angular play as the friction device operates. Specifically, the vibrations passing through the damper generate shocks between the aforementioned coupling elements and the support component. The level of shock is such that it is possible to peen or shear these coupling elements.

This can lead to premature wear and reduced performance of the friction device.

SUMMARY OF THE INVENTION

The objective of the damper according to the invention is to solve the technical problems posed by the prior art by rigidly fixing the friction washer in rotation on the first element.

This object is achieved, according to the invention, by means of a torsion damper for a vehicle powertrain, the damper comprising:

- a first element being able to rotate about an axis of rotation X, the first element comprising at least one support element,
- a second element movable in rotation with respect to the first element about the X axis,
- springs mounted between the first element and the second element so as to compress to allow relative rotation about the X axis between the first element and the second element,
- a friction device comprising a friction washer provided with at least one fixing portion fixed rigidly in rotation on a support element of the first element, the friction washer having a friction portion having a friction track backed against a dorsal face of the friction portion; and
- an elastic washer arranged axially between the first element and the dorsal face of the friction portion, each fixing portion for fixing to the first element being connected to the friction portion by a flexible element allowing axial displacement of the dorsal face of the friction portion with respect to the support element of the first element.

Thus, it is possible to achieve rotational blocking between the support element and the friction washer, without angular play, while allowing a displacement of the dorsal face of the friction portion relative to the support element, which compensates for wear of the friction surfaces.

As will be seen later, another objective of the invention is to reduce the axial load of a friction washer fixed so as to be locked in rotation, without play, on a damper support element.

The damper may also have one or more of the following features:

The first element comprises an annular element such as a disk or a washer, the center of which is arranged on the axis of rotation X, said at least one support element being fixed in rotation with respect to this washer or to this disk.

Preferably, said at least one support element is a portion of the annular element.

According to a variant not shown, said at least one support element is an element attached to the annular element.

Each fixing portion of the friction washer is fixed to the annular element via a support element.

The torsion damper is able to transmit the torque of the vehicle engine to the driving wheels of the vehicle.

According to one embodiment, the first element is intended to be driven in rotation by the engine of the vehicle, and the second element is intended to drive in rotation a vehicle gearbox input member, such as a shaft.

According to a variant, the second element is intended to be driven in rotation by the engine of the vehicle, and the first element is intended to drive in rotation a vehicle gearbox input member, such as a shaft.

The elastic washer is arranged axially between the first element and the dorsal face of the friction portion, to axially press the friction portion of the friction washer against a friction surface of the second element or a friction surface rotatably coupled with the second element.

Each fixing portion is axially blocked on one of the support elements.

Each fixing portion is mounted so as to be locked in rotation with one of the support elements, without angular play.

In particular, the mounting of the fixing portions is not removable so as to avoid angular mounting play. In other words, the fixing portions are fixed in a nonremovable manner to the support elements.

The flexible element is a flexible tab or the flexible element includes a flexible tab.

The fixing portion is connected to the support element by a rigid connection such as riveting or welding. The term "rigid connection" is understood to mean a connection with no degree of freedom.

Each support element and each fixing portion each have at least one orifice, each orifice of the fixing portion being arranged opposite an orifice of the support element, and each fixing portion is rigidly fixed in rotation to the corresponding support element by means of at least one fixing element, such as a rivet or a pin.

Each fixing portion is also axially blocked on the support element by virtue of the fixing element.

In particular, the fixing element may be a rivet comprising a shank intended to be engaged in the orifices of the fixing portion and of the support element, and further comprising at each end a head which is enlarged relative to the shank.

The friction portion is formed on a radially internal portion of the friction washer and each fixing portion is formed on a radially external portion of the friction washer.

The fixing portions are arranged radially on the outside of the springs.

The springs are helical springs which extend circumferentially or tangentially around the X axis over a mean installation radius, and the fixing portions are arranged radially outside the mean installation radius.

The mean installation radius is taken at the level of the mid-region of the length of a spring, and at the level of the main axis around which the turns wind.

The friction washer has a plurality of fixing portions and the first element includes a plurality of support elements, each support element receiving a fixing portion.

Each flexible element is elastically deformable axially.

According to one embodiment, the friction washer and the elastic washer are configured so that, over at least an axial displacement range of the dorsal face in which the loads of the friction washer and the elastic washer are oriented axially in the same direction, the evolution of the load exerted by the flexible element(s) increases when the dorsal face of the friction washer moves away from the fixing portion of the friction washer, and the evolution of the load exerted by the elastic washer decreases when the dorsal face of the friction washer moves away from the fixing portion of the friction washer.

According to one embodiment, the friction washer and the elastic washer are configured so that, from the initial axial position of the dorsal face to its axial position furthest from the support element, the loads of the friction washer and the elastic washer are oriented axially in the same direction, and the evolution of the load exerted by the flexible element(s) increases when the dorsal face of the friction washer moves away from the fixing portion of the friction washer, while the evolution of the load exerted by the elastic washer decreases when the dorsal face of the friction washer moves away from the fixing portion of the friction washer.

According to another embodiment, the friction washer and the elastic washer are configured such that, in operation, for at least one state of compression of the elastic washer, an axial load is exerted by each flexible element in a direction opposite to the direction of the load exerted by the elastic washer on the friction portion.

The load exerted by the elastic washer is greater than the load exerted by the flexible element(s) of the friction washer.

The state of compression of the elastic washer may depend on the initial preload of the elastic washer and the state of wear of the friction device.

Each flexible element and the elastic washer are configured such that the load exerted by the elastic washer is greater than the load exerted by the flexible element (s) of the friction washer.

According to one embodiment, the friction washer and the elastic washer are configured so that, over at least a range of axial displacement of the dorsal face, the evolution of the load exerted by the flexible element(s) compensates for the evolution of the load of the elastic washer, so that the resulting load is substantially constant over this range of axial displacement of the dorsal face. Thus, the load generated by the flexible elements does not disturb the operation of the friction device of the damper.

The flexible element(s) have linear axial stiffness.

According to a particular embodiment, the friction washer and the elastic washer are configured so that the orientation of the load exerted by the flexible element(s) is reversed for a predetermined compression threshold of the elastic washer.

Over a compression range of the elastic washer, the load exerted by the elastic washer increases as the elastic washer expands axially. In other words, the load increases over this range.

The compression range therefore corresponds here to the range of axial displacement of the dorsal face mentioned above.

According to one embodiment, the increase in the load over said compression range is between 50% and 200%, in particular between 100% and 150%, for example 120%.

The load exerted by the elastic washer decreases between its maximum state of compression (flat) and its minimum state of compression (free), except over the compression range of the elastic washer for which the load exerted by the elastic washer increases when the axial dimension of the elastic washer increases.

The flexible element(s) and the elastic washer are configured such that, over said compression range, a decrease in the load exerted by the flexible element(s) compensates for the increase in load of the elastic washer over the compression range so that the resulting load is substantially constant over said compression range.

Each flexible element is arranged circumferentially between two springs.

The first element comprises openings for accommodating the springs, each support element being arranged circumferentially between two neighboring openings.

The friction portion is composed of a plurality of friction pads spaced apart from one another.

Each friction pad is associated with a single flexible element.

The friction pads each extend circularly around the X axis over a limited angular sector, for example between 50 and 120 degrees.

Each flexible element is connected to a friction pad over a region of the friction pad located circumferentially on a mid-region of the friction pad.

Each friction pad and the corresponding flexible element form a T.

Preferably, the damper comprises as many friction pads as there are springs interposed between the first element and the second element.

Preferably, the friction portion forms a radially internal ring of the friction washer.

The friction ring extends around the axis of rotation X and develops radially.

This radially internal ring can be continuous or discontinuous.

In other words, it can include interruptions or cuts (in particular when the friction portion is formed by a plurality of friction pads).

The friction washer includes a radially external ring.

The radially external ring develops radially and can serve as a support for friction linings, in particular when the damper is integrated into a clutch disk.

The friction washer may also be devoid of a radially external ring so that each fixing portion is a fixing blade spaced circumferentially from the other fixing blades.

Where appropriate, and when the radially internal ring which forms the friction portion is discontinuous, the friction washer is then formed by a plurality of distinct components arranged around the axis of rotation, each component comprising a fixing blade, a flexible element and a friction pad.

For example, for a damper comprising n springs, the friction washer is formed by n components, the friction plate of each component preferably extending over an angular sector between 360/n−10 degrees and 360/n−1 degrees Each flexible element connects the friction portion and the radially external ring.

Alternatively or in combination, each flexible element is formed at least in part on the radially external ring.

The fixing portion is arranged between two springs and the flexible element bypasses these two springs, radially outside these springs.

The radially external ring extends around the axis of rotation X and develops radially.

The fixing portion, the flexible element, the friction portion and where appropriate the radially external ring are formed in one piece, for example from a sheet.

A space is present between two neighboring flexible elements, in particular to allow the arrangement of a spring. In other words, the flexible elements are each arranged between two springs.

The radially external ring is arranged against a radially external edge of the first element.

Each fixing portion is formed on a widening which extends each flexible element and which connects the flexible element to the radially external ring.

Each fixing portion is arranged to receive one or two rivets.

According to another embodiment, the damper comprises n springs interposed circumferentially between the first element and the second element; and the friction washer comprises n/2 flexible elements.

Thus, one can have a friction washer with less stiffness, in other words one can lower the value of the load exerted by the flexible elements.

Each flexible element has a hole. Thus the load exerted is lower.

The hole may be arranged at a radially internal end of the flexible element.

The damper comprises n springs and the friction washer comprises n/2 fixing portions.

Each fixing portion is arranged circumferentially between two neighboring springs.

Each fixing portion is arranged circumferentially between two neighboring flexible elements.

The fixing portion is formed on an extension projecting radially inside the radially external ring.

The radially external ring comprises notches, each notch being arranged radially facing a flexible element so that the notch separates a radially external region of the flexible element into two strands.

The radially external region of the flexible element thus forms a V.

Here the flexible element is directly connected to the radially external ring. The fixing portions do not separate the flexible elements from the radially external ring.

Each flexible element extends in a direction inclined with respect to the radial direction, for example by an angle of between 5 and 30 degrees. Thus, for the same diameter of the friction washer, the length of the flexible elements is increased, which makes it possible to reduce their stiffness.

Each flexible element has a radially internal end and a radially external end, the radially internal end being narrower than the radially external end.

The fixing portion is formed radially outside the radially external end of the flexible element.

The width is measured in the circumferential direction.

According to another embodiment, each flexible element extends between two steps of axial unevenness.

The elastic washer comprises hooking tabs locked in rotation on the first element.

These hooking tabs are arranged radially inside the fixing portions of the friction washer, with radial overlap.

The hooking tabs of the elastic washer are angularly offset with respect to the flexible elements.

The elastic washer is compressed in the new state with a nominal preload, this nominal preload being obtained when the second element is fitted against the friction washer.

The first element comprises radial tabs between the openings for receiving the springs. The hooking tabs are housed on these tabs.

The support elements are also arranged on these tabs.

According to one embodiment, the friction washer is cut from a sheet.

According to one embodiment, the friction washer is flat before it is mounted in the torsion damper.

According to one embodiment, the friction washer is mounted by sandwiching the elastic washer between the first element and the friction washer.

Where appropriate, the deformation of the friction washer during its mounting makes it possible to generate the axial load of the flexible elements, in particular in a direction opposite to the direction of the forces exerted by the elastic washer.

One of the first element and the second element comprises two lateral washers mounted so as to be locked in rotation around the X axis and spaced apart axially from one another; and the other of the first element and the second element comprises an intermediate disk arranged axially between the two lateral washers.

The invention also relates to a clutch disk for a vehicle powertrain fitted with a damper as described above and with a friction disk provided with friction linings, the friction disk being carried by one of the first element and the second element, in particular at its external periphery.

The second element comprises two lateral washers and the first element comprises a central disk arranged axially between the two lateral washers.

A hub is locked in rotation with the lateral washers. In other words, the second element comprises this hub.

The hub is provided with a collar on either side of which the lateral washers abut axially.

The hub and lateral washers are riveted together.

According to a first variant, in particular devoid of predamper, the hub is an output hub capable of driving a gearbox input shaft.

According to a second variant, the hub is an intermediate hub coupled with angular play with an output hub, and the clutch disk further comprises a pre-damper provided with pre-damping springs arranged kinematically between the output hub and the second element.

The clutch disk therefore comprises an output hub driven in rotation directly or indirectly (via a pre-damper for example) by the other among the first element and the second element.

According to one embodiment, the clutch disk is fitted with a damper as described above and with a friction disk provided with friction linings on its radially external portion, the friction disk being fixed to the first element and the friction disk comprising an internal friction region on its radially internal portion.

An additional friction washer is arranged axially between the internal friction region of the friction disk and the first element, the additional friction washer being driven in rotation by the second element.

There is a straight line parallel to the axis of rotation X passing through the internal friction region of the friction disk and the friction portion of the friction washer.

The friction disk is fixed on the first element in a rigid manner in rotation, without angular play.

Thus, the first element carries two attached friction surfaces without angular play, which reduces wear and increases reliability.

The friction portion of the friction washer and the internal friction region of the friction disk are arranged axially on either side of the first element, in particular of its support elements.

The friction disk and the friction washer are fixed on the first element with the same fixing elements, for example the same rivets.

The radially internal portion of the friction disk is connected to the radially external portion of the friction disk by an axially flexible intermediate portion.

The friction track of the friction washer is pressed directly or indirectly against one of the lateral washers and the internal friction region of the friction disk is pressed directly or indirectly against the other of the lateral washers.

The axial load exerted by the elastic washer makes it possible to press not only the friction track of the friction washer against one of the lateral washers but also the internal friction region of the friction disk against the other of the lateral washers.

The friction disk, the first element (in particular the central disk), the elastic washer, the friction washer and the additional friction washer together form a pre-assembled subassembly suitable for being inserted between the two lateral washers.

This subassembly is mounted without axial blocking on the hub.

BRIEF DESCRIPTION OF THE FIGURES

Further characteristics and advantages of the invention will arise from reading the description below with reference to the attached figures described below.

FIG. 5 is a cutaway perspective view of the damper of FIG. 1.

FIG. 6 is a front view of the friction device of the clutch disk of FIG. 1.

For greater clarity, identical or similar elements are identified using identical reference signs throughout the figures.

DETAILED DESCRIPTION OF EMBODIMENTS

Naturally, the embodiments illustrated by the figures described above are given merely as nonlimiting examples.

In the description and the claims, the terms "external" and "internal" and also the orientations "axial" and "radial" will be used to designate elements of the damper according to the definitions given in the description. By convention, the "radial" orientation is directed orthogonally to the axis of rotation X of the damper determining the "axial" orientation and, from the inside to the outside away from said axis of rotation, the "circumferential" orientation is circular about the X axis and the tangential orientation is directed orthogonally to the axis of rotation of the damper and orthogonally to the radial direction. The terms "external" and "internal" are used to define the relative position of one element with respect to another, with reference to the axis of rotation of the damper, an element close to the axis thus being described as internal as opposed to an external element situated radially at the periphery.

Figure 1:
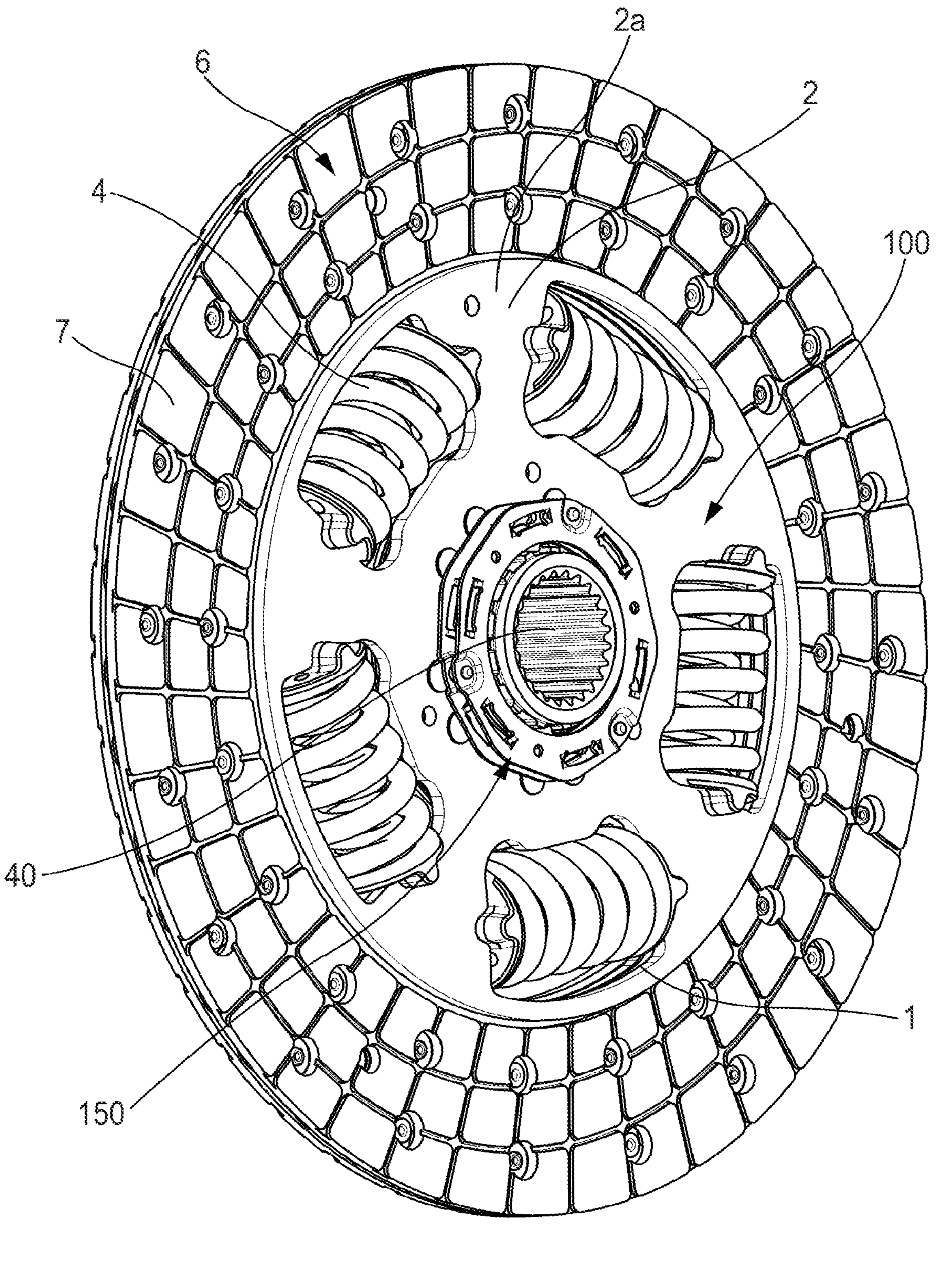
FIG. 1 is a perspective view of a clutch disk according to a first embodiment.

FIG. 1 represents a perspective view of a clutch disk for a vehicle powertrain. The clutch disk is fitted with a damper 100 and with a friction disk 6 provided with friction linings 7.

The torsion damper 100 comprises a first element 1 able to rotate about an axis of rotation X, and a second element 2 movable in rotation with respect to the first element 1 about the X axis. This torsion damper 100 is able to transmit the torque of the vehicle engine to the driving wheels of the vehicle.

Springs 4 are mounted between the first element 1 and the second element 2, so as to compress to allow relative rotation about the X axis between the first element 1 and the second element 2.

The second element 2 comprises two lateral washers **2*a* and 2*b* mounted so as to be locked in rotation about the X axis and spaced apart axially from one another; and the first element comprises an intermediate disk 1 arranged axially between the two lateral washers 2*a* and 2*b***.

The friction disk 6 is carried here by the intermediate disk 1 at its external periphery.

The clutch disk further comprises an output hub 40 driven in rotation indirectly, via a pre-damper 150, by the second element 2, via the lateral washer **2*a*. The output hub 40 is coupled with angular play with the second element 2. The pre-damper 150 is provided with pre-damper springs kinematically arranged between the output hub 40 and the second element 2**.

Figure 2:
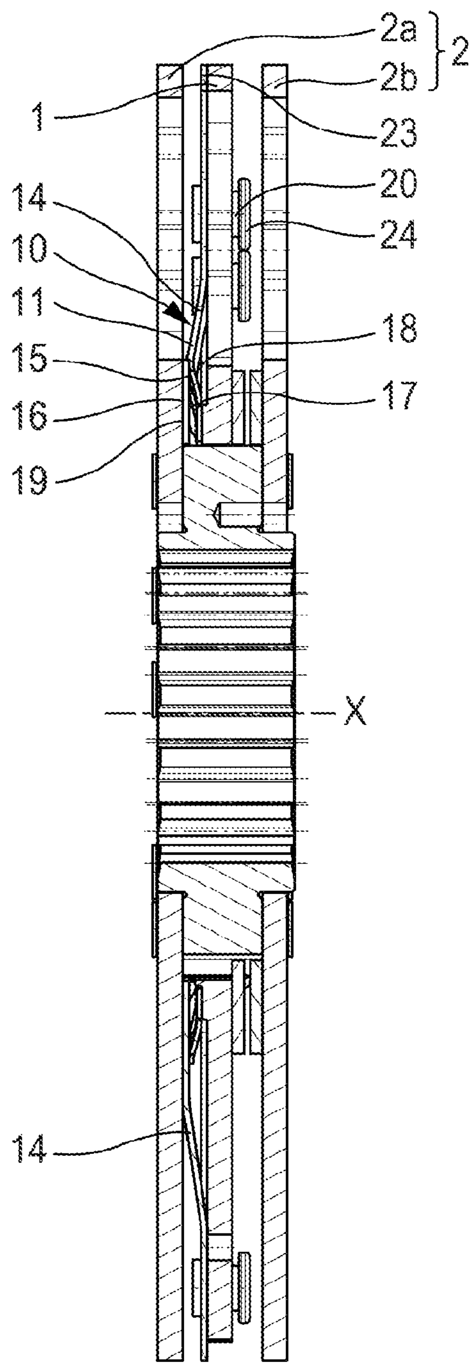
FIG. 2 is a schematic sectional view of the friction device of the clutch disk of FIG. 1.

As can be seen in FIGS. 2 and 5, a hub comprises a collar on either side of which the lateral washers **2*a* and 2*b*** abut axially.

In addition, as can be seen in FIGS. 2, 4, 5 and 6, the intermediate disk 1 comprises a support element 13 and the damper 100 has a friction device 10 comprising a friction washer 11 provided with at least one fixing portion 12 fixed in a rigid manner in rotation on the support element 13 of the intermediate disk 1.

The friction washer 11 has a friction portion 15 having a friction track 16 backed against a dorsal face 17 of the friction portion 15.

The friction device 10 also comprises an elastic washer 18 arranged axially between the intermediate disk 1 and the dorsal face 17 of the friction portion 15, each fixing portion 12 of the intermediate disk 1 being connected to the friction portion 15 by a flexible element 14 allowing axial displacement of the dorsal face 17 of the friction portion 15 relative to the support element 13 of the intermediate disk 1. Thus, it is possible to achieve rotational blocking between the support element and the friction washer 11, without angular play, while allowing a displacement of the dorsal face 17 of the friction portion 15 relative to the support element 13, which makes it possible to compensate for the wear of the friction surfaces.

The flexible element 14 is a flexible tab 14. It is formed integrally with the friction portion 15 and the fixing portion 12 of the friction washer 11 which is advantageously manufactured from a sheet.

It can be seen from FIG. 2 that the elastic washer 18 is arranged axially between the intermediate disk 1 and the dorsal face 17 of the friction portion 15, to axially press the friction portion 15 of the friction washer 11 against a friction surface 19 of the lateral washer 2*a*.

Each support element 13 and each fixing portion 12 each have at least one orifice 21, 22. Each orifice of the fixing portion 12 is arranged opposite an orifice of the support element 13.

Each fixing portion 12 can thus be fixed in a rigid manner in rotation to the corresponding support element 13 by means of at least one fixing element 20, such as a rivet 20.

Figure 4:
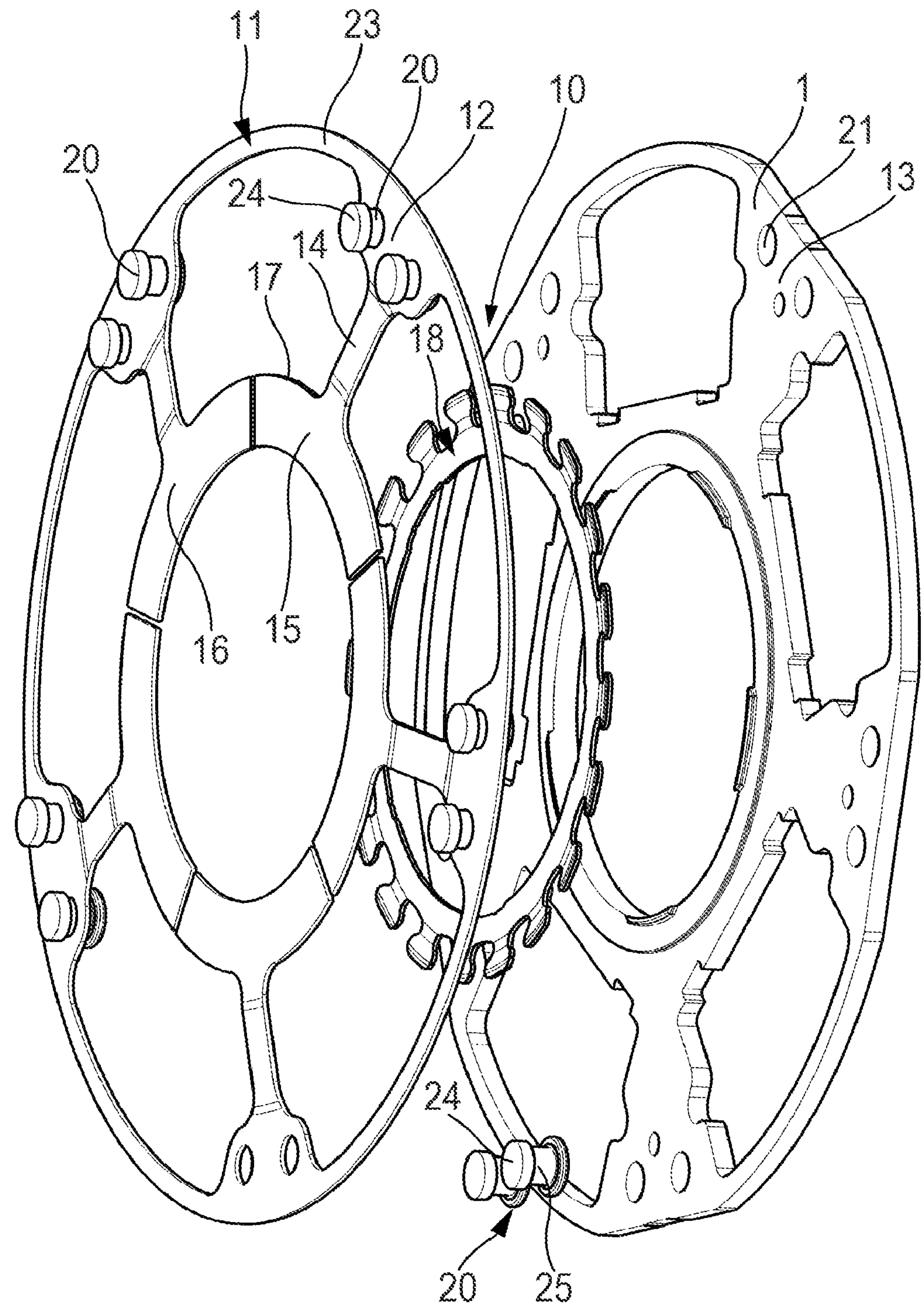
FIG. 4 is an exploded perspective view of the friction device and the first element.

Each fixing portion 12 is also blocked axially on the support element 13 thanks to the rivets 20. The rivets 20 are shown at the bottom of FIG. 4. Each rivet comprises a shank 25 intended to be engaged in the orifices 21, 22 of the fixing portion 12 and of the support element 13, and further comprising at each end a head 24 which is enlarged relative to the shank 25, which also makes it possible to axially block the fixing portions 12.

The friction portion 15 is formed on a radially internal part of the friction washer 11 and each fixing portion 12 is formed on a radially external part of the friction washer 11.

Figure 3:
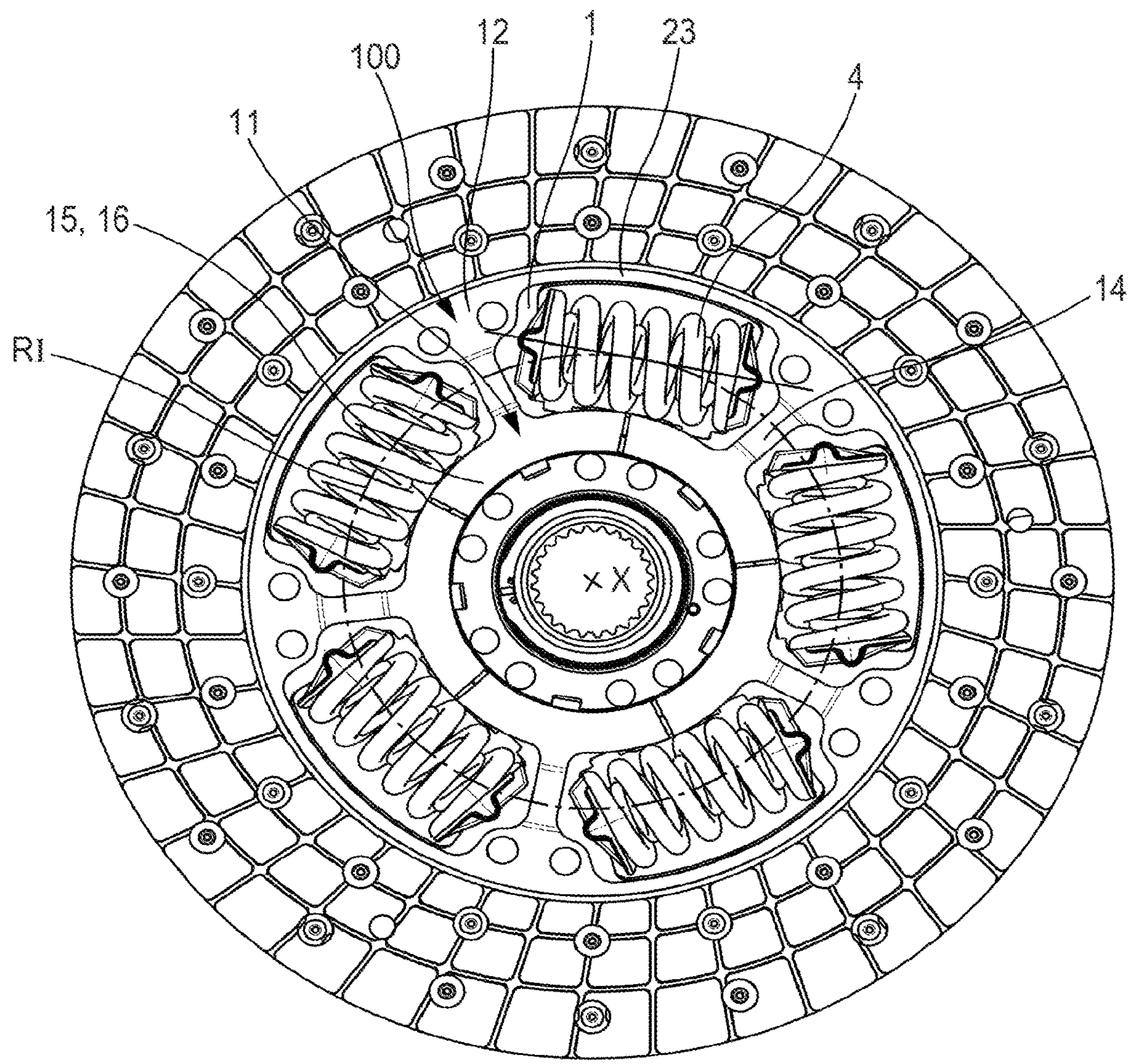
FIG. 3 is a front view of the clutch disk of FIG. 1.

As can be seen in FIGS. 1 and 3, the springs 4 of the clutch disk are helical springs which extend circumferentially or tangentially around the X axis over a mean installation radius RI, and the fixing portions 12 are arranged radially outside the mean installation radius RI. The mean installation radius RI is taken at the level of the mid-region of the length of a spring 4, and at the level of the main axis around which the turns of the spring 4 are wound.

The friction washer 11 comprises a plurality of fixing portions 12 and the intermediate disk 1 comprises a plurality of support elements 13, each support element 13 receiving a fixing portion 12.

Each flexible tab is elastically deformable axially.

Each flexible tab 14 and the elastic washer 18 are configured such that, in operation, for at least one state of compression of the elastic washer 18, an axial load is exerted by each flexible tab 14 in a direction opposite to the direction of the load exerted by the elastic washer 18 on the friction portion 15.

The flexible tabs 14 and the elastic washer 18 are configured so that the load exerted by the elastic washer 18 remains greater than the load exerted by the flexible tab(s) 14 of the friction washer 11.

In general, the state of compression of the elastic washer 18 may depend on the initial preload of the elastic washer 18 and the state of wear of the friction device 10.

More precisely, in this first embodiment, the flexible tab(s) 14 and the elastic washer 18 are configured so that, over at least an axial displacement range P of the dorsal face, the evolution of the load exerted by the flexible tab(s) 14 compensates for the evolution of the load of the elastic washer 18, so that the resulting load is substantially constant over this range of axial displacement of the dorsal face. Thus, the load generated by the flexible tabs 14 does not disturb the operation of the friction device 10 of the damper.

Figure 7:
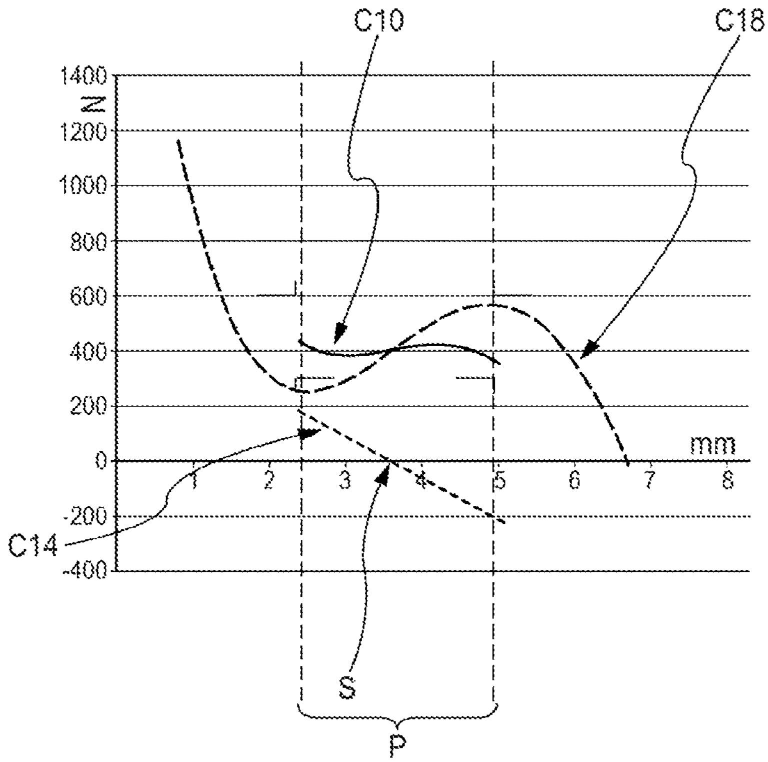
FIG. 7 represents the stiffnesses of the elastic washer and of the friction washer, and the resultant of these two stiffnesses.

This characteristic appears on the stiffness curves of FIG. 7.

Over a compression range P of the elastic washer 18, the load exerted by the elastic washer 18 increases when the axial dimension of the elastic washer 18 increases. In other words, the load increases over this range.

The compression range P therefore corresponds here to the range of axial displacement of the dorsal face mentioned above.

Here, the increase in the load over said compression range P is about 120%.

The load exerted by the elastic washer 18 decreases between its state of maximum compression (flat) and its state of minimum compression (free), except over the compression range P of the elastic washer 18 for which the load exerted by the elastic washer 18 increases when the axial dimension of the elastic washer 18 increases.

The flexible tabs have a load C14 with a substantially linear axial stiffness.

The flexible tabs 14 and the elastic washer 18 are configured so that the orientation of the load exerted by the flexible tab(s) 14 is reversed for a predetermined compression threshold S of the elastic washer 18. Specifically, it can be seen that the curve C14 crosses the axis of the abscissas at the point S.

The flexible tabs and the elastic washer 18 are configured such that, over said compression range P, a decrease in the load C18 exerted by the flexible tab(s) compensates for the increase in load of the elastic washer 18 over the compression range P so that the resulting load C10 is substantially constant over said compression range P.

It can be seen in FIG. 4 that each flexible tab 14 is arranged circumferentially between two springs 4. The intermediate disk 1 comprises openings for accommodating the springs 4, and each support element 13 is arranged circumferentially between two neighboring openings.

The friction portion 15 is composed of a plurality of friction pads spaced apart from one another. Each friction pad 15 is associated with a single flexible tab 14.

The friction pads 15 each extend circularly around the X axis over a limited angular sector of about 75 degrees.

Each flexible tab 14 is connected to a friction pad over a region of the friction pad 15 located circumferentially on a mid-region of the friction pad 15.

Each friction pad 15 and the corresponding flexible tab 14 form a T.

The damper here comprises as many friction pads as there are springs interposed between the intermediate disk 1 and the second element 2.

The friction portion 15 forms a radially internal ring of the friction washer 11 which extends around the axis of rotation X and develops radially.

This radially internal ring is discontinuous in the first embodiment. In other words, it has interruptions.

The friction washer also comprises a radially external ring 23 and each flexible tab 14 connects the friction portion 15 and the radially external ring 23. The radially external ring extends around the axis of rotation X and also develops radially.

The fixing portion 12, the flexible tabs, the friction portion 15 and the radially external ring 23 are formed integrally from a cut sheet.

A space is present between two adjacent flexible tabs 14, in particular to allow the arrangement of a spring 4. In other words, the flexible tabs 14 are each arranged between two springs 4.

The radially external ring 23 is arranged against a radially external edge of the intermediate disk 1.

Each fixing portion 12 is formed on a widening which extends the flexible tab 14 and which connects the flexible tab 14 to the radially external ring 23. Each fixing portion 12 is here arranged to receive two rivets 20.

Figure 8:
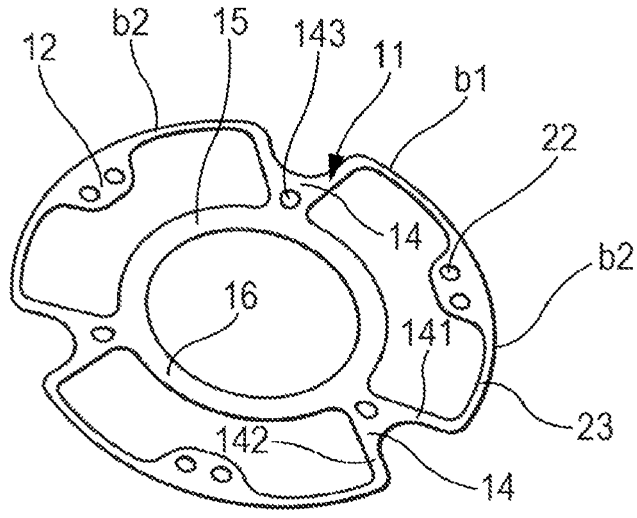
FIG. 8 is a perspective view of a friction washer according to a second embodiment.
Figure 9:
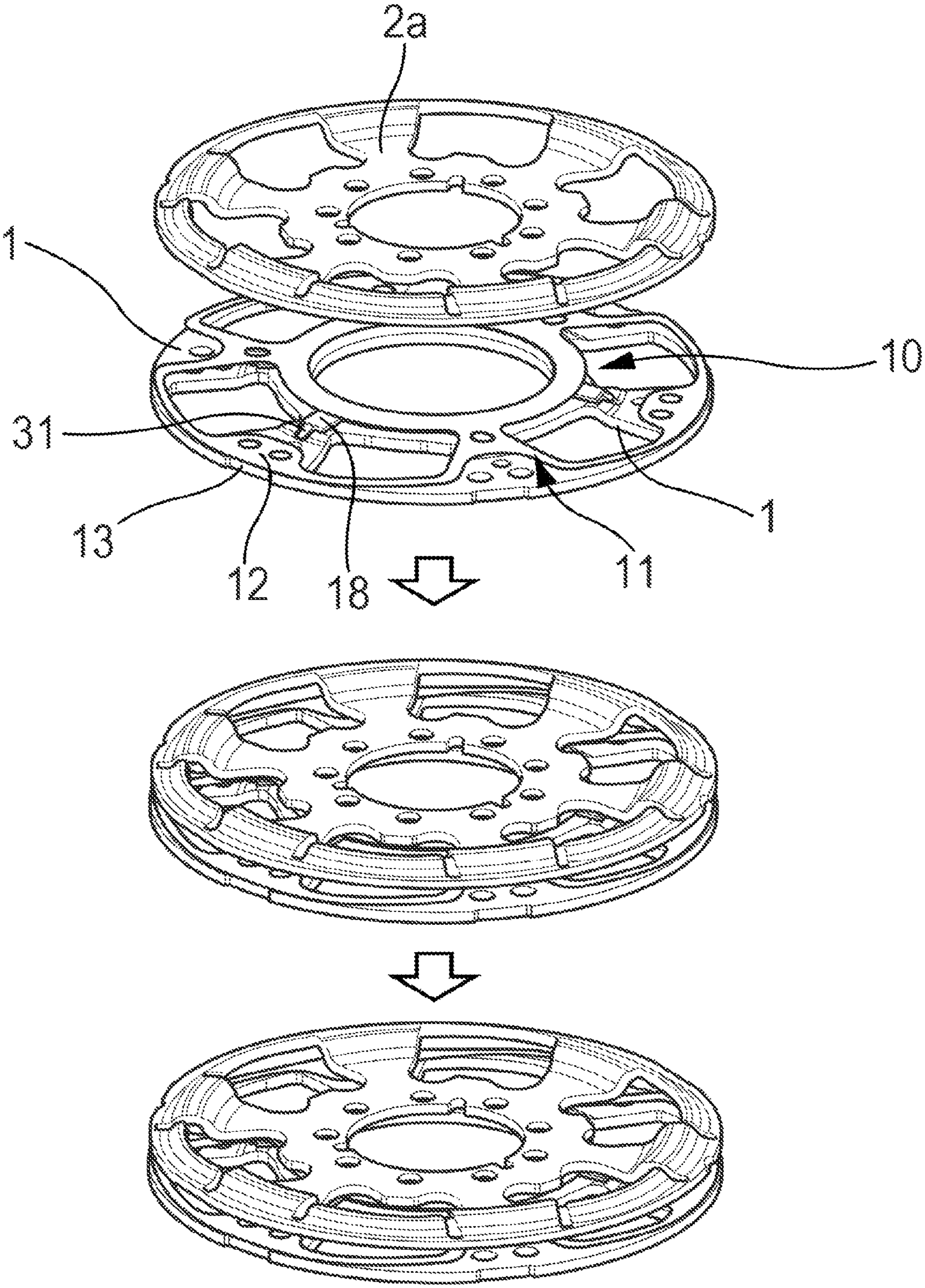
FIG. 9 illustrates a method of mounting a friction washer according to the second embodiment.

According to a second embodiment shown in FIGS. 8 and 9, the damper comprises an even number n of springs, for example six, interposed circumferentially between the intermediate disk 1 and the second element. The friction washer 11 comprises n/2 fixing portions 12, for example three, and n/2 flexible elements, for example three. Thus, it is possible to have a friction washer 11 with less axial stiffness. Each fixing portion can be arranged circumferentially between two neighboring springs.

Each flexible element comprises two branches b1 and b2. The two branches of a flexible element each connect the same fixing portion 12 to two distinct regions of the friction portion. Each branch bypasses the radially external edge of a spring and then the end of a spring. Each branch has a first portion running along one of the springs radially outside this spring. Each branch b1, b2 also comprises a second portion connecting the first portion of the branch to the friction portion. This second branch portion is arranged circumferentially between two springs. Each branch has an L-shape. Each fixing portion 12 is arranged between two springs and the associated flexible element bypasses these two springs, radially outside these springs. From the fixing portion 12, each first branch portion therefore develops in two opposite circumferential directions.

One of the branches b2 of a first flexible element and one of the branches b1 of a second neighboring flexible element are connected at their second portion. The second portions of these two branches together form a flexible tab 14. Each fixing portion 12 is therefore arranged circumferentially between two adjacent flexible tabs 14.

In addition, each flexible tab 14 has a hole 143. Thus the load exerted is even lower. The hole 143 can be arranged at a radially internal end of a flexible tab 14.

The fixing portion 12 is formed on an extension projecting radially inside the radially external ring 23.

The radially external ring 23 comprises notches, each notch being arranged radially facing a flexible tab 14 so that the notch separates a radially external region of the flexible tab 14 into two strands 141 and 142. The radially external region of each flexible tab 14 thus forms a V.

Each strand is extended by a first portion of the branch of a flexible element.

Here the flexible tab 14 is directly connected to the radially external ring and the flexible element is formed at least in part on the radially external ring 23. Specifically, the radially external ring portions connecting each fixing portion 12 to each flexible tab 14 are also flexible so that the flexible element, by virtue of its great length, has a relatively low elastic load. In other words, the first branch portions are also flexible.

The fixing portions do not separate the flexible tabs from the radially external ring.

Of course, one could also have other embodiments with respectively 4, 8, 10 springs and respectively 2, 4, 5 flexible tabs.

Figure 10:
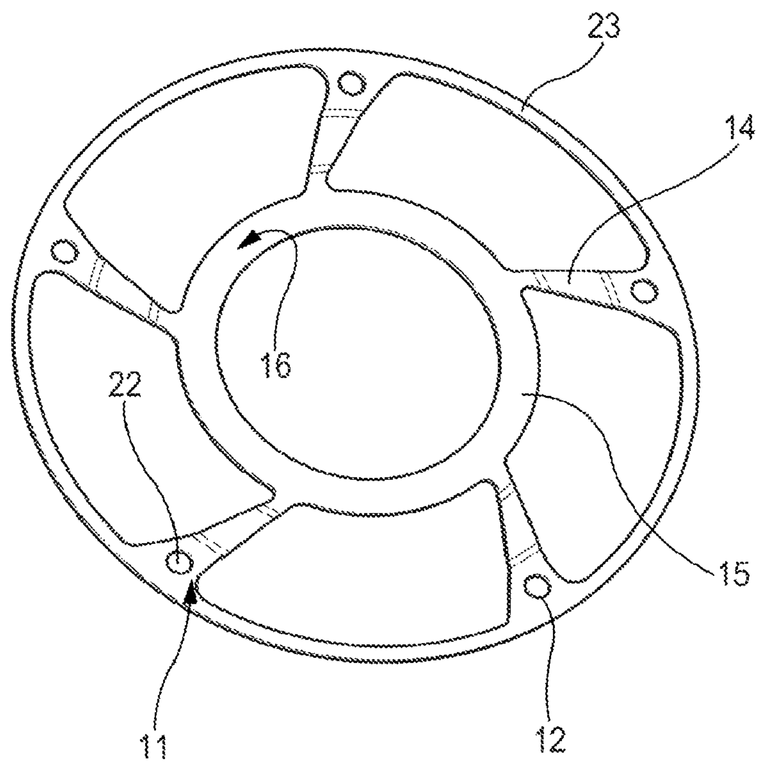
FIG. 10 is a perspective view of a friction washer according to a third embodiment.

In the third embodiment shown in FIG. 10, the friction washer 11 comprises five flexible tabs 14. The damper in which it will be integrated includes five springs.

Each flexible tab 14 extends in a direction inclined relative to the radial direction, for example by an angle of between 5 and 30 degrees.

Each flexible tab 14 has a radially internal end and a radially external end, the radially internal end being narrower than the radially external end. The width is measured in the circumferential direction.

A fixing portion 12 is formed radially on the outside of the radially external end of each flexible tab 14.

Each flexible tab 14 extends between two steps of axial unevenness.

The drawings of FIG. 9 show the mounting of the friction device 10.

The elastic washer comprises hooking tabs 31 locked in rotation on the intermediate disk 1. These hooking tabs 31 are arranged radially inside the fixing portions 12 of the friction washer 11, with radial overlap.

The hooking tabs 31 of the elastic washer 18 are angularly offset with respect to the flexible tabs 14.

The intermediate disk 1 has radial tabs between the openings for receiving the springs. The hooking tabs 31 are housed on these radial tabs. The support elements 13 are also arranged on these radial tabs.

The friction washer 11 is cut from a sheet. It is flat before it is mounted in the torsion damper.

The friction washer 11 is mounted on the intermediate disk 1 by sandwiching the elastic washer 18 between the intermediate disk 1 and the friction washer 11.

As the friction washer 11 is flat, the deformation of the friction washer 11 during its assembly makes it possible to generate the axial load of the flexible elements 14, in particular in a direction opposite to the direction of the forces exerted by the elastic washer 18.

The elastic washer 18 is compressed in the new state with a nominal preload. This nominal preload is obtained when mounting a lateral washer 2*a* of the second element 2 against the friction washer 11.

Figure 11:
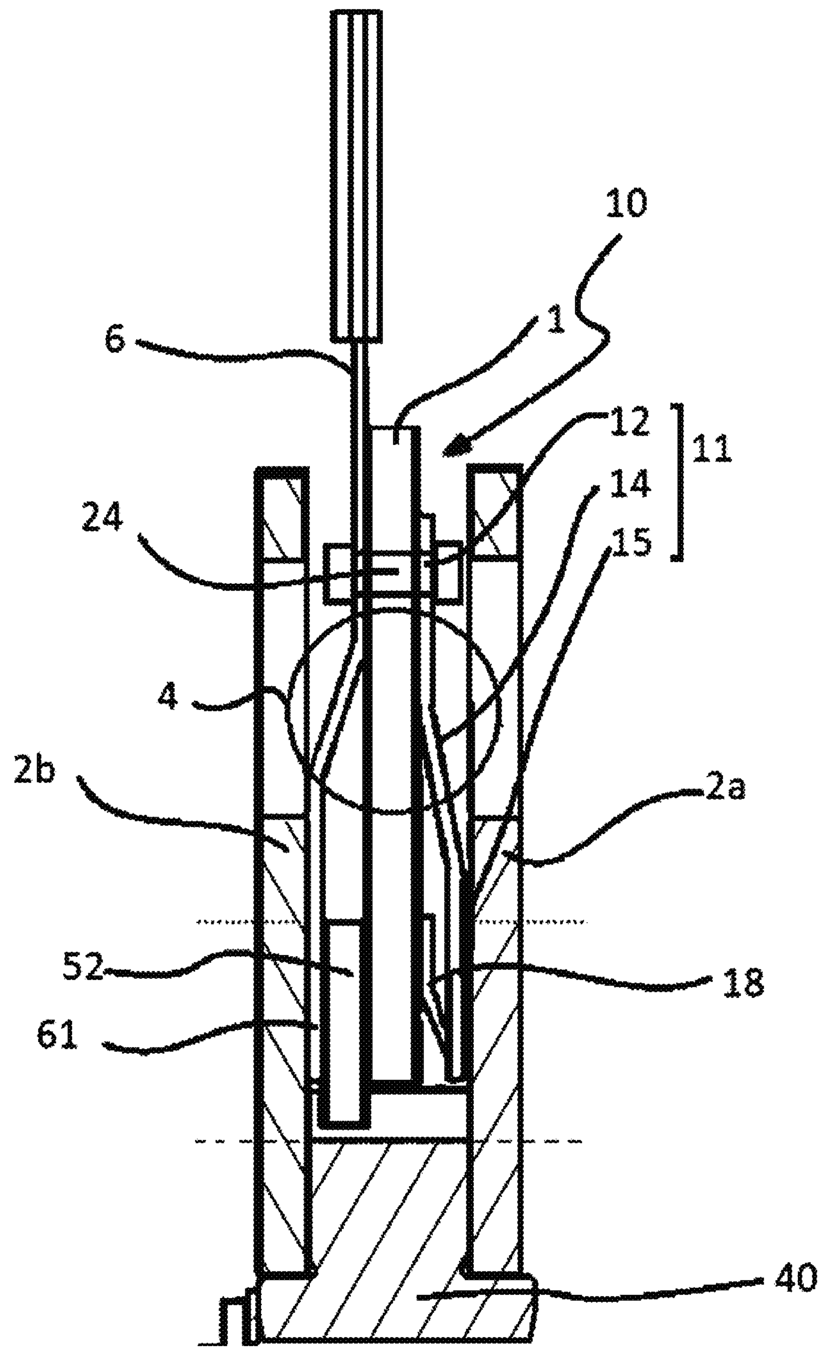
FIG. 11 shows another clutch disk relating to another embodiment of the invention.

In FIG. 11 there is shown another example of a clutch disk incorporating an embodiment of the invention.

This clutch disk comprises a first element 1 comprising a central disk and a second element 2 comprising the two lateral washers 2*a*, 2*b* and a hub 40.

Helical springs 4 can be compressed circumferentially between the first element 1 and the second element 2 during a relative rotation between the first element 1 and the second element 2.

The hub 40 can be an output hub coupled to a gearbox input shaft, or else an intermediate hub mounted with angular play on an output hub with a pre-damper kinematically interposed between the intermediate hub and the output hub.

The clutch disk comprises a friction disk 6 provided with friction linings on its radially external portion.

The friction disk 6 is fixed to the first element 1 and the friction disk 6 comprises an internal friction region 61 on its radially internal portion.

The friction disk 6 is rigidly fixed in rotation on the central disk of the first element 1, without angular play.

Thus, the first element 1 carries two friction surfaces locked in rotation and attached without angular play, which reduces wear and increases reliability.

An additional friction washer 52 is arranged axially between the internal friction region 61 of the friction disk 6 and the central disk.

The additional friction washer 52 is rotated by the second element 2, thanks to an engagement by splines employed between the hub 40 and the additional friction washer 52. The additional friction washer 52 thus rubs on one of its faces on the central disk and on the other of its faces on the internal friction region 61 of the friction disk 6.

The friction portion 15 of the friction washer 11 and the internal friction region 61 of the friction disk 6 are arranged axially on either side of the first element 1, in particular of its support elements 13.

The friction disk 6 and the friction washer 11 are fixed on the first element 1 with the same rivets 24. In a variant not shown, the fixing elements of the friction disk and of the friction washer may be separate. In a still different variant embodiment, one and/or the other of the friction disk and the friction washer can be welded to the first element, in particular to the central disk.

The radially internal portion 61 of the friction disk 6 is connected to the radially external portion of the friction disk 6 by an axially flexible intermediate portion.

The friction track 15 of the friction washer 11 is pressed directly against the lateral washer 2*a* and the internal friction region 61 of the friction disk 6 is pressed directly against the other lateral washer 2*b*. The term "directly" is understood to mean direct contact between the components mentioned.

The friction disk 6, the first element 1 (in particular the central disk), the elastic washer 18, the friction washer 11 and the additional friction washer 52 together form a pre-assembled subassembly suitable for being inserted between the two lateral washers 2*a* and 2*b*.

The axial load exerted by the elastic washer 18 thus makes it possible to press not only the friction track of the friction washer 11 against the lateral washer 2*a* but also the internal friction region 61 of the friction disk 6 against the other lateral washer 2*b*.

This subassembly is able to slide axially on the intermediate hub 40; or on the output hub in the absence of a pre-damper.

The invention is not limited to this type of application (clutch disk) and to this type of architecture.

For example, here the intermediate disk 1 is intended to be driven in rotation by the engine of the vehicle, and the second element 2 is intended to drive in rotation a vehicle gearbox input member, such as a shaft.

According to a variant, the second element 2 may be intended to be driven in rotation by the engine of the vehicle, and the intermediate disk 1 may be intended to drive in rotation a vehicle gearbox input member, such as a shaft.

According to another variant, it is the first element which comprises two lateral washers mounted so as to be locked in rotation around the X axis and spaced apart axially from one another; and the second element which comprises an intermediate disk arranged axially between the two lateral washers.

The invention claimed is:

1. A torsion damper for a vehicle powertrain, the damper comprising:

- a first element being able to rotate about an axis of rotation, the first element comprising at least one support element,
- a second element movable in rotation with respect to the first element about the axis of rotation,
- springs mounted between the first element and the second element so as to compress to allow relative rotation about the axis of rotation between the first element and the second element,
- a friction device comprising a friction washer provided with at least one fixing portion rigidly fixed in rotation on the support element of the first element, the friction washer having a friction portion having a friction track backed against a dorsal face of the friction portion; and an elastic washer arranged axially between the first element and the dorsal face of the friction portion, each fixing portion for fixing to the first element being connected to the friction portion by a flexible element allowing axial displacement of the dorsal face of the friction portion relative to the support element of the first element,
- wherein each fixing portion is mounted so as to be locked in rotation with one of the support elements, without angular play.

2. The torsion damper as claimed in claim 1 wherein the elastic washer is arranged axially between the first element and the dorsal face of the friction portion, for axially pressing the friction portion of the friction washer against a friction surface of the second element or a friction surface rotatably coupled with the second element.

3. The torsion damper as claimed in claim 2, wherein each fixing portion is axially blocked on one of the support elements.

4. The torsion damper as claimed in claim 2, wherein the fixing portion is linked to the support element by a rigid connection.

5. The torsion damper as claimed in claim 2, wherein each support element and each fixing portion each have at least one orifice, each orifice of the fixing portion being arranged opposite an orifice of the support element, and each fixing portion is rigidly fixed in rotation to the corresponding support element by means of at least one fixing element.

6. The torsion damper as claimed in claim 1, wherein each fixing portion is axially blocked on one of the support elements.

7. The torsion damper as claimed in claim 1, wherein the fixing portion is linked to the support element by a rigid connection.

8. The torsion damper as claimed in claim 1, wherein each support element and each fixing portion each have at least one orifice, each orifice of the fixing portion being arranged opposite an orifice of the support element, and each fixing portion is rigidly fixed in rotation to the corresponding support element by means of at least one fixing element.

9. The torsion damper as claimed in claim 1, wherein the friction portion is formed on a radially internal part of the friction washer and each fixing portion is formed on a radially external part of the friction washer.

10. The torsion damper as claimed in claim 1, wherein the springs are helical springs which extend circumferentially or tangentially around the axis of rotation over a mean installation radius, and the fixing portions are arranged radially outside the mean installation radius.

11. The torsion damper as claimed in claim 1, wherein each flexible element is elastically deformable axially.

12. The torsion damper as claimed in claim 1, wherein the friction washer and the elastic washer are configured so that, over at least an axial displacement range of the dorsal face in which the loads of the friction washer and the elastic washer are oriented axially in the same direction, the evolution of the load exerted by the flexible element(s) increases when the dorsal face of the friction washer moves away from the fixing portion of the friction washer, and the evolution of the load exerted by the elastic washer decreases when the dorsal face of the friction washer moves away from the fixing portion of the friction washer.

13. The torsion damper as claimed in claim 1, wherein the friction washer and the elastic washer are configured such that, in operation, for at least one state of compression of the elastic washer, an axial load is exerted by each flexible element in a direction opposite to the direction of the load exerted by the elastic washer on the friction portion, the load exerted by the elastic washer being greater than the load exerted by the flexible element(s) of the friction washer.

14. The torsion damper as claimed in claim 1, wherein the friction washer and the elastic washer are configured so that, over at least an axial displacement range of the dorsal face, the evolution of the load exerted by the flexible element(s) compensates for the evolution of the load of the elastic washer, so that the resulting load is substantially constant over this axial displacement range of the dorsal face.

15. The torsion damper as claimed in claim 1, wherein the friction washer and the elastic washer are configured such that the orientation of the load exerted by the flexible element(s) is reversed for a predetermined compression threshold of the elastic washer.

16. The torsion damper as claimed in claim 1, wherein, over a compression range of the elastic washer, the load exerted by the elastic washer increases when the elastic washer expands axially.

17. The torsion damper as claimed in claim 1, wherein the friction portion is composed of a plurality of friction pads spaced apart from one another.

18. A clutch disk for a vehicle powertrain fitted with a damper as claimed in claim 1 and with a friction disk provided with friction linings, the friction disk being carried by the first element and the friction disk comprising an internal friction region on its radially internal portion, an additional friction washer being arranged axially between the internal friction region of the friction disk and the first element, the additional friction washer being rotated by the second element; the friction portion of the friction washer and the internal friction region of the friction disk being arranged axially on either side of the first element, in particular of its support elements.

19. The torsion damper as claimed in claim 1, wherein the fixing portion is linked to the support element by one of riveting or welding.

20. A torsion damper for a vehicle powertrain, the damper comprising:

a first element being able to rotate about an axis of rotation, the first element comprising at least one support element, a second element movable in rotation with respect to the first element about the axis of rotation, springs mounted between the first element and the second element so as to compress to allow relative rotation about the axis of rotation between the first element and the second element, a friction device comprising a friction washer provided with at least one fixing portion rigidly fixed in rotation on the support element of the first element, the friction washer having a friction portion having a friction track backed against a dorsal face of the friction portion; and an elastic washer arranged axially between the first element and the dorsal face of the friction portion, each fixing portion for fixing to the first element being connected to the friction portion by a flexible element allowing axial displacement of the dorsal face of the friction portion relative to the support element of the first element, wherein the elastic washer is arranged axially between the first element and the dorsal face of the friction portion, for axially pressing the friction portion of the friction washer against a friction surface of the second element or a friction surface rotatably coupled with the second element, and wherein each fixing portion is mounted so as to be locked in rotation with one of the support elements, without angular play.

* * * * *